United States Patent
Statnikov

(10) Patent No.: US 11,619,707 B1
(45) Date of Patent: Apr. 4, 2023

(54) METHOD AND SYSTEM FOR CALIBRATING A RADAR SENSOR

(71) Applicant: APTIV TECHNOLOGIES LIMITED, St. Michael (BB)

(72) Inventor: Konstantin Statnikov, Düsseldorf (DE)

(73) Assignee: APTIV TECHNOLOGIES LIMITED, St. Michael (BB)

(*) Notice: Subject to any disclaimer, the term of this patent is extended or adjusted under 35 U.S.C. 154(b) by 0 days.

(21) Appl. No.: 17/952,490

(22) Filed: Sep. 26, 2022

(30) Foreign Application Priority Data

Oct. 1, 2021 (EP) .................................. 21200419

(51) Int. Cl.
G01S 7/40 (2006.01)
G01S 13/931 (2020.01)

(52) U.S. Cl.
CPC .............. G01S 7/40 (2013.01); G01S 13/931 (2013.01)

(58) Field of Classification Search
CPC ........ G01S 7/40; G01S 7/4082; G01S 7/4091; G01S 3/931
See application file for complete search history.

(56) References Cited

U.S. PATENT DOCUMENTS

| | | | | |
|---|---|---|---|---|
| 4,176,354 A * | 11/1979 | Hsiao | ..................... | H01Q 3/267 342/173 |
| 4,806,932 A * | 2/1989 | Bechtel | ................. | G01S 7/4052 342/6 |
| 4,965,732 A * | 10/1990 | Roy, III | ............... | G06K 9/0057 342/147 |
| 6,232,918 B1 * | 5/2001 | Wax | ........................ | H04W 4/20 342/174 |
| 7,999,724 B2 * | 8/2011 | Cho | ..................... | G01S 13/9019 342/25 D |
| 9,559,417 B1 * | 1/2017 | Schwarzwalder | ... | H01Q 3/2605 |
| 9,791,552 B1 * | 10/2017 | Schuman | .............. | G01S 7/4026 |
| 9,903,946 B2 * | 2/2018 | Willey | .................. | G01S 13/878 |
| 10,830,869 B2 * | 11/2020 | Raphaeli | ............... | G01S 7/4026 |
| 2005/0179587 A1 * | 8/2005 | Mosher | ................. | G01S 7/4056 342/158 |

(Continued)

FOREIGN PATENT DOCUMENTS

| | | |
|---|---|---|
| EP | 2339364 A2 | 6/2011 |
| EP | 3454081 A1 | 3/2019 |
| WO | 2019018201 A1 | 1/2019 |

OTHER PUBLICATIONS

European Search Report issued by the European Patent Office in connection with International Application No. 21200419.6, dated Mar. 30, 2022.

(Continued)

*Primary Examiner* — Peter M Bythrow
(74) *Attorney, Agent, or Firm* — Carter, DeLuca & Farrell LLP; George Likourezos

(57) ABSTRACT

A method is provided for calibrating a radar sensor. According to the method, a plurality of radar detections is acquired via the radar sensor, and an angle of arrival is determined for each of the radar detections. Equidistant bins of an electric angle are defined which are related to the angle of arrival, and the radar detections are assigned to the equidistant bins of the electric angle. Based on the assignment, a reconstructed array manifold is determined for calibrating the radar sensor.

20 Claims, 9 Drawing Sheets

(56) References Cited

U.S. PATENT DOCUMENTS

Figure 1:
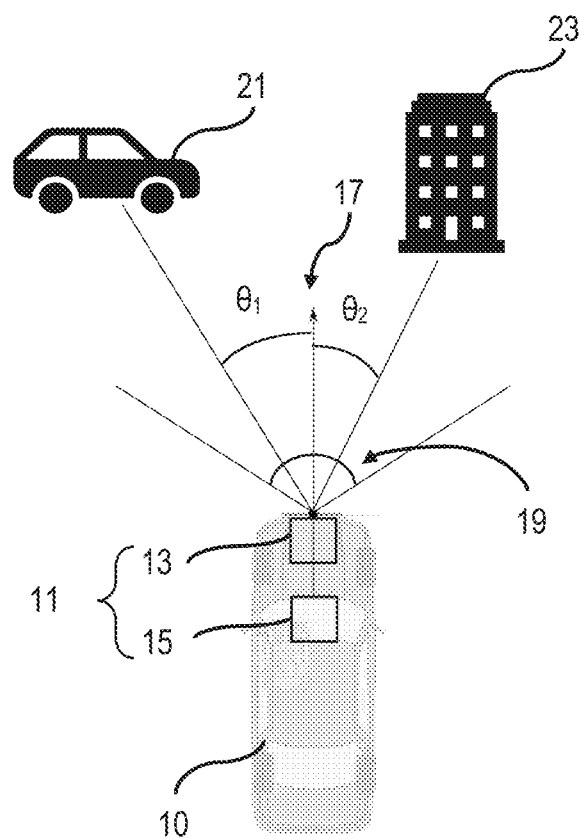

| | | | | |
|---|---|---|---|---|
| 2011/0153268 A1* | 6/2011 | Jordan | ................ | G01S 7/52004 |
| | | | | 702/151 |
| 2012/0268315 A1* | 10/2012 | Tirkel | ................... | G01S 13/325 |
| | | | | 342/147 |
| 2015/0070207 A1* | 3/2015 | Millar | ................ | G01S 13/4454 |
| | | | | 342/174 |
| 2017/0160381 A1* | 6/2017 | Cho | ....................... | G01S 7/4004 |
| 2017/0343665 A1* | 11/2017 | Willey | .................... | G01S 7/003 |
| 2018/0113195 A1* | 4/2018 | Bialer | ..................... | G01S 13/86 |
| 2018/0306902 A1* | 10/2018 | Pernstål | ..................... | G01S 7/40 |
| 2019/0025405 A1* | 1/2019 | Liu | ........................ | G01S 7/4026 |
| 2019/0079180 A1* | 3/2019 | Ioffe | ....................... | G01V 8/005 |
| 2020/0363501 A1* | 11/2020 | Lau | ....................... | G01S 7/4017 |
| 2021/0096213 A1* | 4/2021 | Han | ........................ | G01S 13/52 |
| 2021/0223362 A1* | 7/2021 | Kim | ....................... | G06V 20/58 |
| 2022/0196798 A1* | 6/2022 | Chen | ....................... | G01S 13/89 |

OTHER PUBLICATIONS

Michael Ulrich, et al., "IQ and array calibration for FMCW radar", Institute of Signal Processing and System Theory, University of Stuttgart, Germany, The 18th International Radar Symposium, Jun. 2017, pp. 1-10.

\* cited by examiner

METHOD AND SYSTEM FOR CALIBRATING A RADAR SENSOR

CROSS-REFERENCE TO RELATED APPLICATION

This application claims the benefit of European patent application serial number EP21200419.6 filed on Oct. 1, 2021. The entire contents of which are hereby incorporated by reference herein.

FIELD

The present disclosure relates to a method and a system for calibrating a radar sensor.

BACKGROUND

Radar sensors are typically used in modern vehicles for driver assistant systems and to facilitate autonomous driving. In addition to range and Doppler measurements regarding objects located in the environment of the vehicle, angle finding (AF) for such objects is an important step in radar signal processing. In order to accomplish these measurements properly, radar sensors need to be calibrated.

Usually, an offline-calibration is performed in an anechoic chamber for a respective radar sensor. However, such an offline-calibration is time-consuming. In addition, the radar sensor to be calibrated has to be placed at a so-called "far-field distance" with respect to a calibration target, which requests a certain size of the anechoic chamber. Furthermore, after being mounted in a vehicle (e.g. beyond a fascia) and being surrounded by further parts of the vehicle, the characteristics of the radar sensor can be affected such that the results of the offline-calibration may not be reliable anymore for the radar sensor mounted in the vehicle.

Accordingly, there is a need to provide methods for calibrating a radar sensor which are less time-consuming and which include the impact of the radar sensor's actual environment.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for calibrating a radar sensor, the method comprising the following steps performed (in other words: carried out) by computer hardware components: acquiring, via the radar sensor, a plurality of radar detections, determining an angle of arrival for each of the radar detections, defining equidistant bins of an electric angle being related to the angle of arrival, assigning the radar detections to the equidistant bins of the electric angle, and based on the assignment, determining a reconstructed array manifold for calibrating the radar sensor.

The plurality of radar detections may include or may be related to a beam vector. The electric angle may also be denoted as a spatial frequency and may be given as the sine of the azimuth angle, e.g. with respect to a boresight direction of the radar sensor. The equidistant bins of the electric angle may include respective equidistant spatial center frequencies. That is, the equidistant bin may divide a predefined range for the electric angle $u=\sin(\theta)$ (wherein $\theta$ is the azimuth angle) into sectors which are centered at the respective equidistant center electric angles $u_i$ and which have a constant spatial bandwidth $\Delta u_i$, wherein i is the index for the respective bin of the electric angle.

The radar sensor may be installed in a vehicle. In this case, the radar sensor may be configured to monitor the environment of the vehicle.

When performing the method, no factory calibration or initial radar sensor calibration, e.g. in an anechoic chamber, is required. In other words, the method does even not require a partial calibration. This is because the azimuth angle as "ground-truth" for the angle of arrival may be derived from the range rate of stationary targets in the field (i.e. located in the environment of the sensor or the vehicle). Alternatively, a partial calibration from factory can also be utilized. For example, a single measurement with a single calibration target being placed at a known angle would be sufficient to calculate a corresponding diagonal calibration matrix.

Furthermore, the method provides a consistent and systematic approach to control the angular sampling for providing the reconstructed array manifold due to the equidistant bins for the electric angle. It turned out that the method has a low computational complexity and a high robustness while providing a good estimation accuracy. That is, a reliable online-calibration may be provided by the method.

According to an embodiment, it may be determined for each of the plurality of radar detections whether the respective radar detection is related to a single scattering center. Radar detections may be disregarded for which it is determined that they are not related to a single scattering center. Therefore, the assignment of the radar detections to the equidistant bins of the electric angle may be restricted to those detections which originate from single scattering centers only. By this restriction, the reconstructed array manifold (i.e. the calibration result) may not be deteriorated by multiple scattering of the transmitted radar waves. Hence, the reliability of the calibration may be improved.

According to a further embodiment, a range may be determined with respect to the radar sensor for each of the plurality of radar detections, and a detection may be selected from the plurality of detections for the assignment to one of the bins of the electric angle only if the range of the detection is greater than a predetermined range. In other words, detections from far-field target objects may be selected only for the calibration since the detections are filtered by range.

The respective angle of arrival may be determined based on a range rate which is estimated from the radar detections. That is, a Doppler frequency shift of the radar detections may be used for determining the angle of arrival. This procedure can be easily accomplished for stationary targets from the field. Therefore, a straightforward manner for determining the ground-truth angle may be applied.

According to a further embodiment, beam vector elements may be determined which are related to the radar detections, and the respective beam vector elements is assigned to the bins of the electric angle. For each bin of the electric angle to which no beam vector element is assigned, a complex value of the beam vector element may be determined for the respective bin by interpolating between the beam vector elements assigned to the adjacent bins. If more than one beam vector element is assigned to a bin of the electric angle, an average of the beam vector elements may be calculated which are assigned to the same bin. Alternatively, any kind of statistical processing and filtering (like e.g. trimmed mean, median and others) can be applied here.

Interpolating and/or averaging the beam vector elements may be performed for the magnitude and/or the phase of the complex valued beam vector elements, or alternatively for their real parts and/or imaginary parts. By considering the respective beam vector elements including interpolating and/or averaging between or within the bins of the electric angle, a uniform weighting of the detections may be achieved over an entire instrumental field of view of the radar sensor. Without such a uniform weighting, uncontrolled and/or unpredicted results might occur for the angular sectors or bins. Conversely, the reliability and completeness of the calibration may be improved by taking interpolating and averaging the beam vector elements into account.

For the averaging, the respective beam vector elements may be weighted by the inverse of the difference between the spatial frequency or electric angle of the measured detection (i.e. of the beam vector element) and of the center of the bin. Additionally, the weighting may be based on the signal-to-noise ratio (SNR) and on the result from the single-scatterer test associated with the respective beam vector. Furthermore, a suitable function fit may be applied for performing the interpolation and/or averaging.

According to a further embodiment, a calibration matrix of the radar sensor may be calculated based on the reconstructed array manifold. The calibration matrix may be applied to any beam vector e.g. to carry out any classical angle finding approach assuming an ideal response e.g. from a radar sensor array. Additionally or alternatively, angle finding may be performed based on the reconstructed array manifold itself. That is, an azimuth angle of the respective target objects may be determined without calculating the calibration matrix. Such an angle finding may be performed by applying a maximum likelihood procedure to a beam vector. For such applications, i.e. for angle finding and/or calculation of the calibration matrix, the reconstructed array manifold may be used as a look-up table.

In another aspect, the present disclosure is directed at a computer system, said computer system comprising a plurality of computer hardware components configured to carry out several or all steps of the computer implemented method described herein.

The computer system may comprise a plurality of computer hardware components (for example a processor, for example processing unit or processing network, at least one memory, for example memory unit or memory network, and at least one non-transitory data storage). It will be understood that further computer hardware components may be provided and used for carrying out steps of the computer implemented method in the computer system. The non-transitory data storage and/or the memory unit may comprise a computer program for instructing the computer to perform several or all steps or aspects of the computer implemented method described herein, for example using the processing unit and the at least one memory unit.

According to another aspect, the computer system further comprises a radar sensor configured to acquire the plurality of radar detections.

In another aspect, the present disclosure is directed at a vehicle comprising the computer system as described herein.

As used herein, the terms processing device and processing unit may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The processing device and the processing unit may include memory (shared, dedicated, or group) that stores code executed by the processor.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

DRAWINGS

Figure 2:
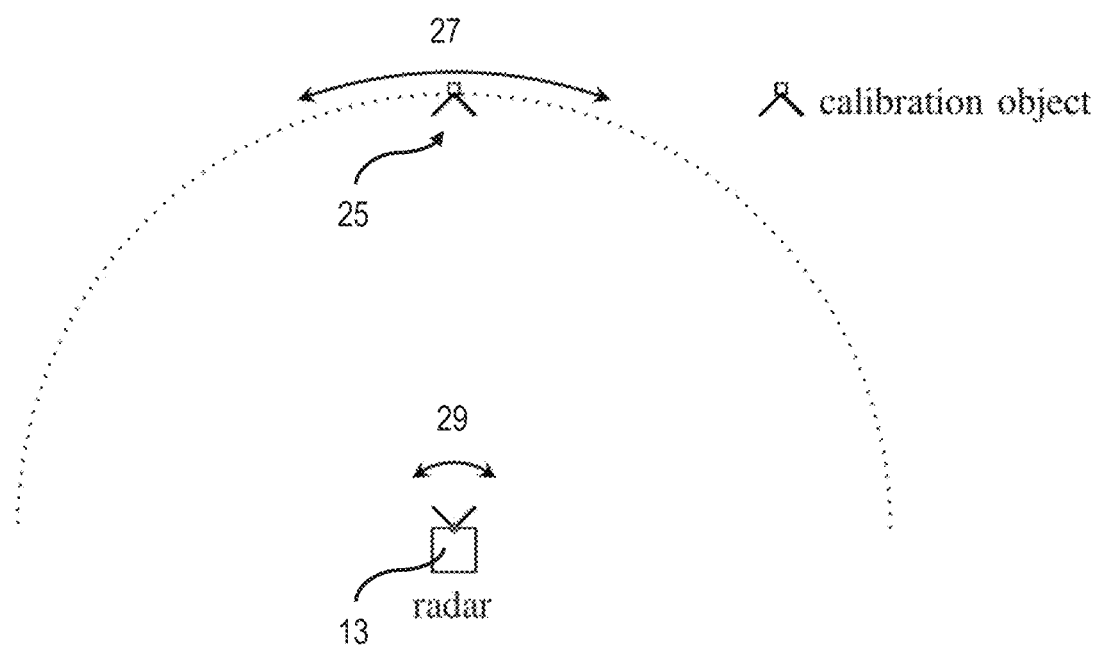
Figure 3:
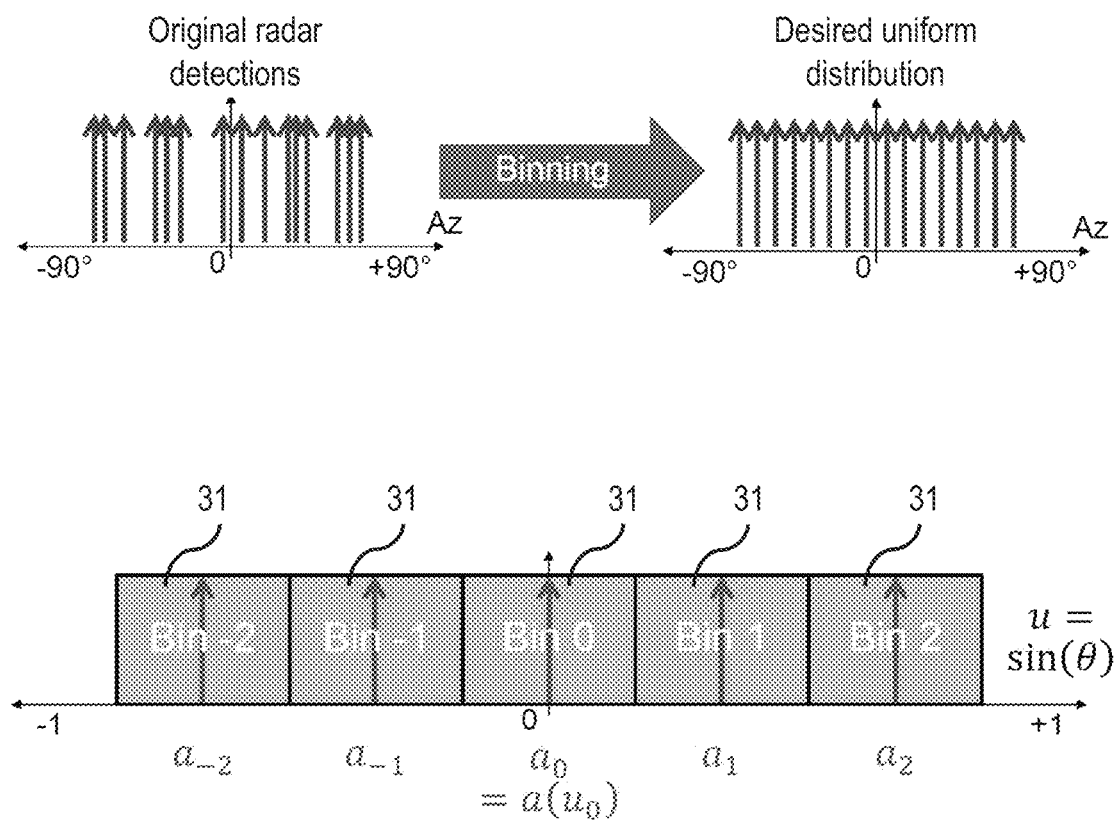
Figure 4:
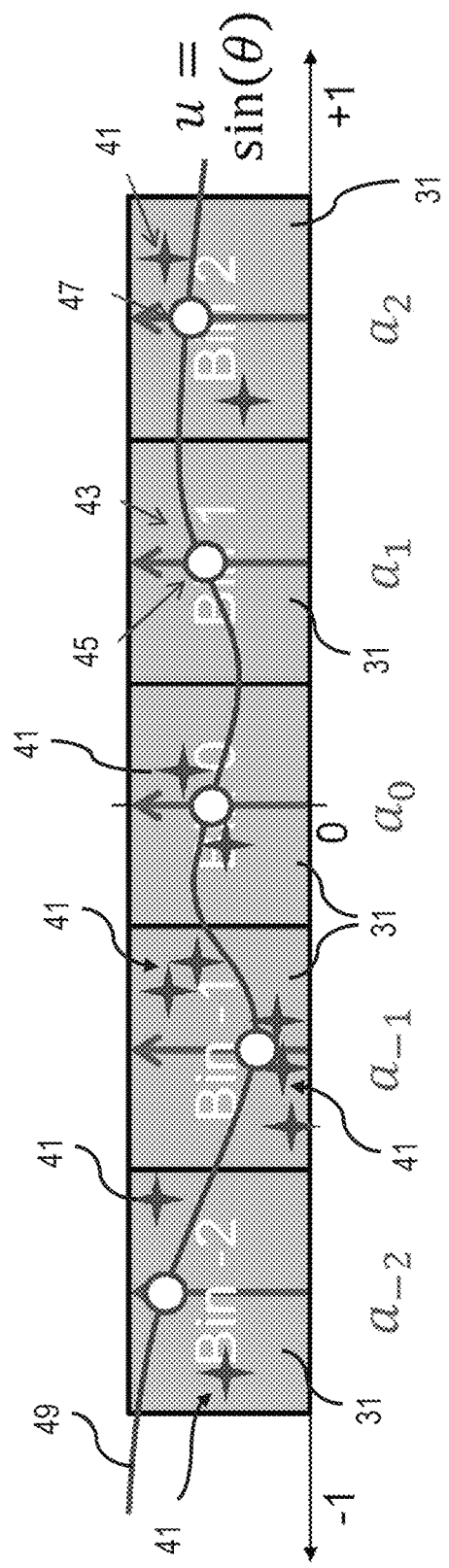
Figure 5:
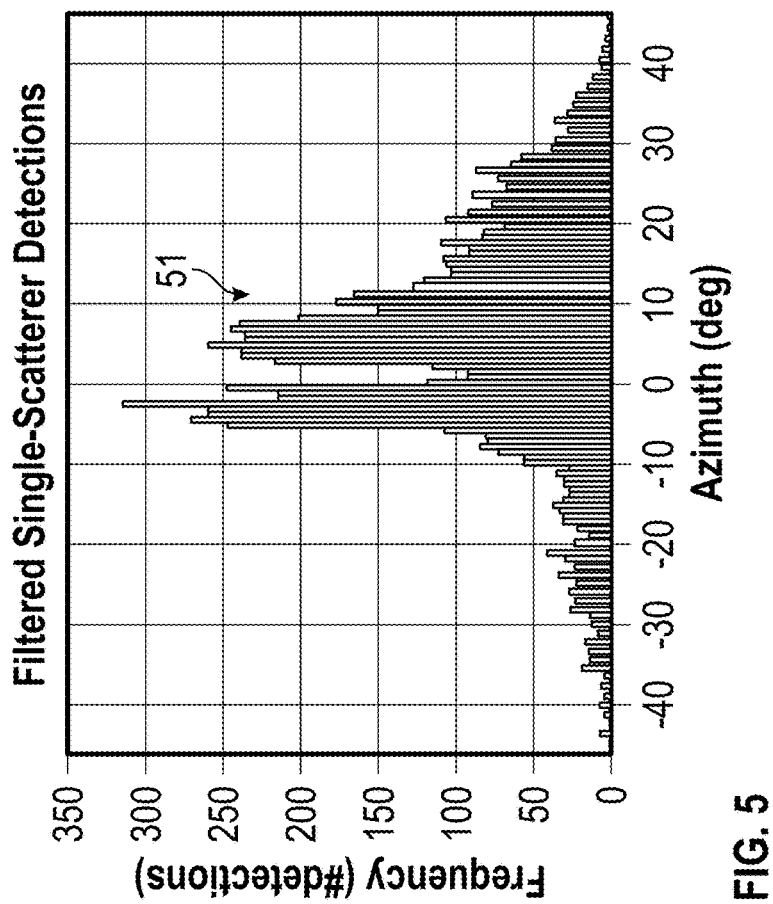
Figure 5:
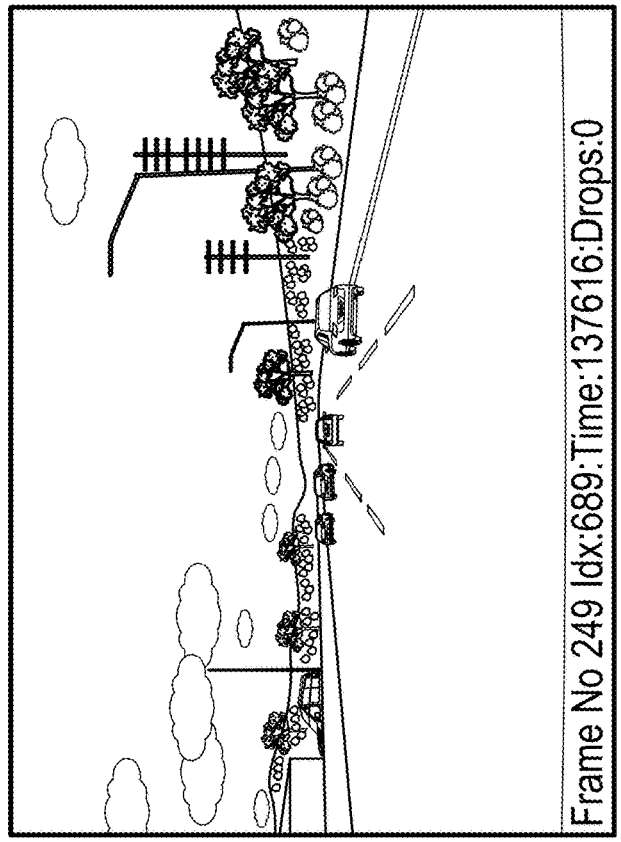
Figure 6:
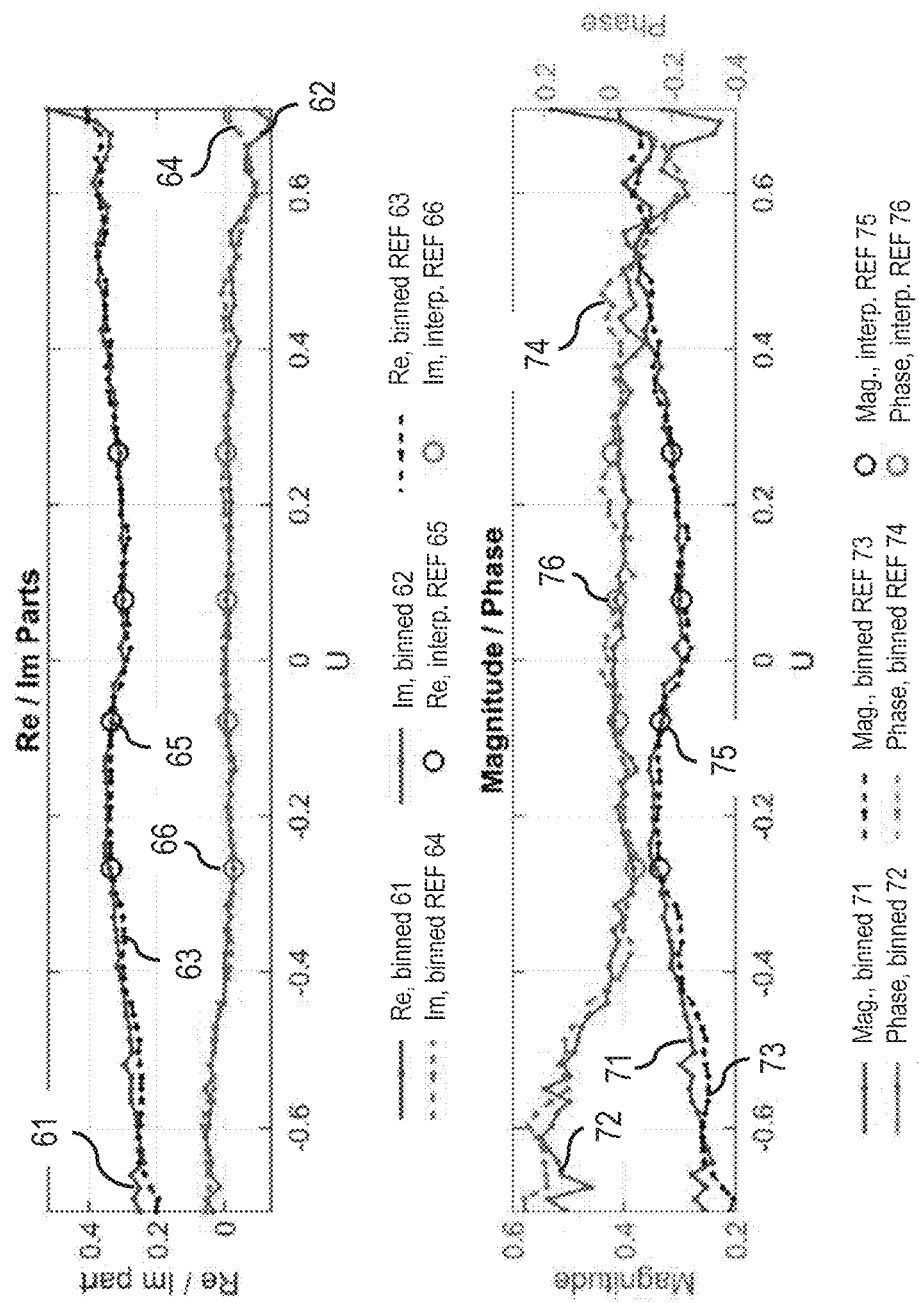
Figure 7:
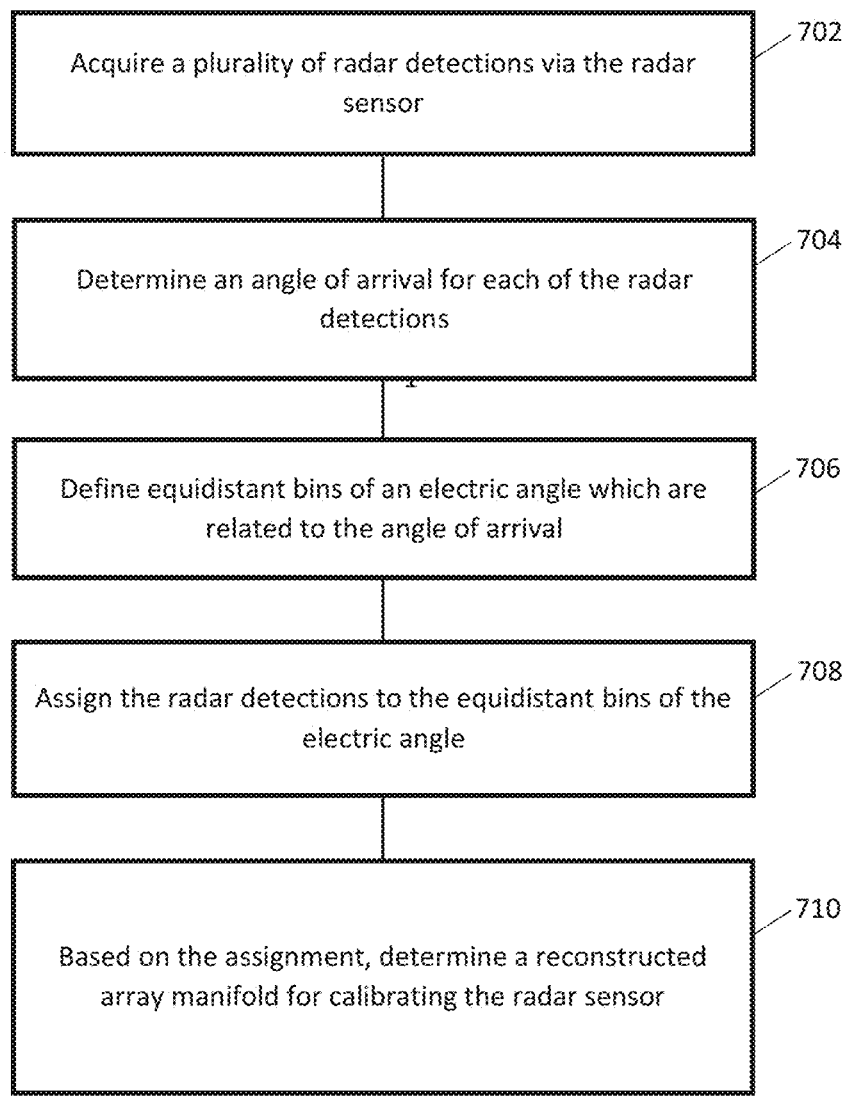
Figure 8:
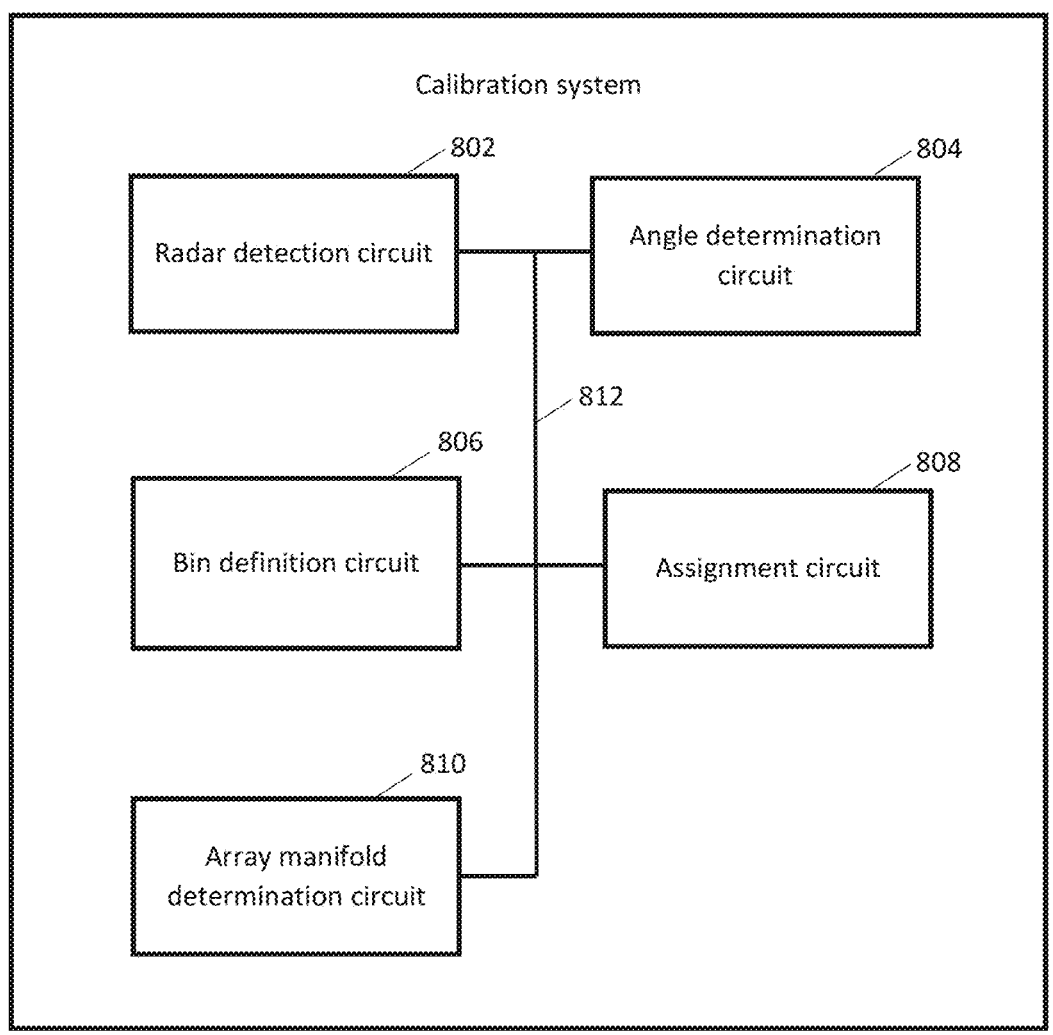
Figure 9:
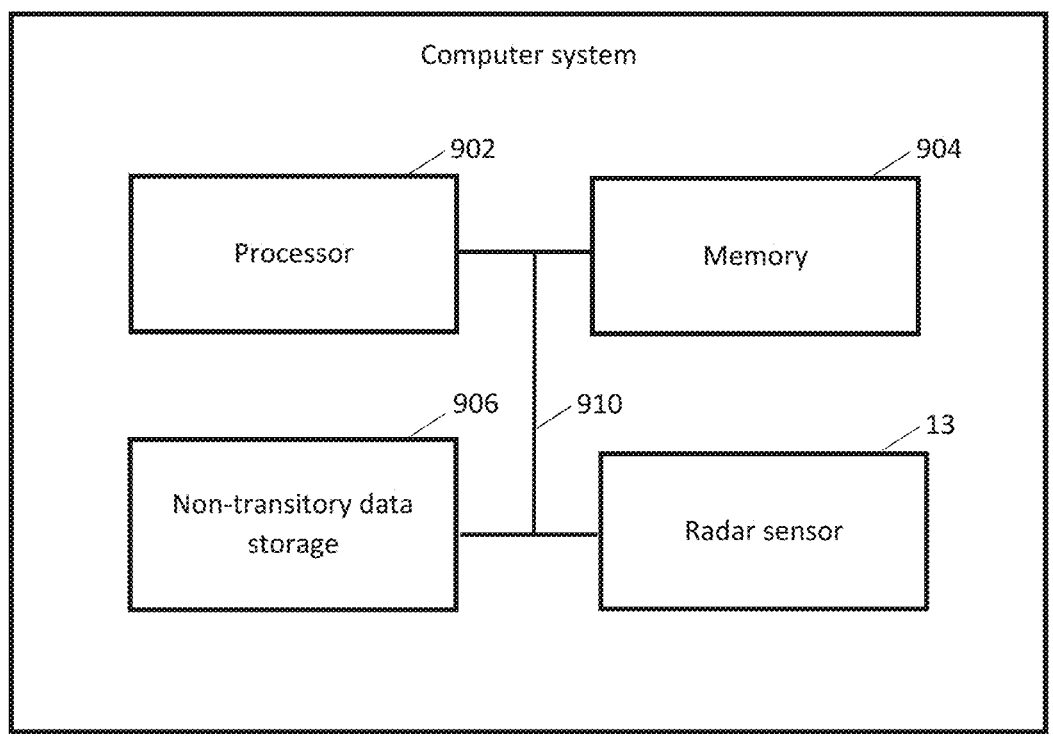

Exemplary embodiments and functions of the present disclosure are described herein in conjunction with the following drawings, showing schematically:

FIG. 1 a vehicle including a computer system for performing a method according to the disclosure, FIG. 2 a calibration procedure according to the related art, FIG. 3 a schematic overview of defining equidistant bins of an electric angle, FIG. 4 the assignment of radar detections to the bin of the electric angle including averaging and interpolation, FIG. 5 a real data scenario providing filtered detections from single scattering centers, FIG. 6 a comparison of a reconstructed array manifold determined by the method according to the disclosure and a reference, FIG. 7 a flow diagram illustrating a method for calibrating a radar sensor according to various embodiments, FIG. 8 a calibration system according to various embodiments, and FIG. 9 a computer system with a plurality of computer hardware components configured to carry out steps of a computer implemented method for calibrating a radar sensor according to various embodiments.

DETAILED DESCRIPTION

FIG. 1 depicts a vehicle 10 including a computer system 11 for carrying out a method for calibrating a radar sensor 13. The computer system 11 includes the radar sensor 13 and a processing unit 15 which is connected to the radar sensor 13 and configured to receive radar detections and to analyze these radar detections according to the steps of the method.

With respect to the radar sensor 13, a boresight direction 17 is defined. The radar sensor 13 includes an instrumental field of view 19 which is defined by the spatial angle for which the radar sensor 13 is able to monitor its environment, i.e. the environment of the vehicle 10.

The radar sensor 13 is configured to transmit radar waves and to provide radar detections which originate from radar waves being reflected by target objects 21, 23. The target objects 21, 23 include moving objects 21, like other vehicles, and stationary objects 23, like buildings etc. Furthermore, the target objects 21, 23 can either be regarded as single scattering centers or as non-single scattering centers. For each of the target objects 21, 23, a respective angle of arrival or azimuth angle $\theta_1$, $\theta_2$ is defined with respect to the boresight direction 19 of the radar sensor 13. The angles of arrival $\theta_1$, $\theta_2$ can be determined based on the radar detections, e.g. by angle finding from range rate (or from the Doppler frequency shift), as is known in the art.

In order to provide proper results, e.g. for range, range rate and azimuth angle of the target object 21, 23, the radar sensor 13 has to be calibrated. FIG. 2 depicts a calibration procedure according to the related art which is performed e.g. in an anechoic chamber. That is, an offline-calibration is usually applied to the radar sensor 13 which uses a calibration object or dedicated target 25. The calibration object 25 needs to be placed at a so-called "far-field distance" with respect to the radar sensor 13. Therefore, the anechoic chamber must have a certain size to fulfil this requirement of placing the calibration object 25 at the far-field distance.

During the offline-calibration procedure, measurements, i.e. radar detections, are required at equally spaced angles between the boresight direction 17 of the radar sensor 13 and the calibration object 25. Hence, either the calibration object 25 is moved with respect to the radar sensor 13 on a circle, i.e. at a constant distance, as indicated by the arrow 27. Alternatively, the radar sensor 13 may be rotated with respect to the calibration object 25, as indicated by the arrow 29. In both cases, the movement of the calibration object 25 or the rotation of the radar sensor 13 has to be accomplished such that the entire field of view 19 (see FIG. 1) of the radar sensor 13 is covered in steps of equally spaced angles.

The offline-calibration as shown in FIG. 2 implicitly provides an equal or uniform weighting for the radar detections with respect to the azimuth angle. Therefore, a respective equation can be established for each sampling angle. This leads to a system of equations which may be solved using well-known mathematical approaches (e.g. a least-squares estimation) in order to calculate the so-called calibration matrix C of the radar sensor 13.

However, after the radar sensor 13 is mounted at a vehicle (e.g. beyond a fascia of the vehicle 10, see FIG. 1) and is therefore surrounded by other components of the vehicle, antenna array characteristics of the radar sensor 13 might be affected and altered with respect to the offline-conditions for which the calibration has been performed in the anechoic chamber. Due to this, the calibration result might not be fully reliable after mounting the radar sensor 13 a vehicle. In addition, the offline-calibration of the radar sensor 13 performed in the anechoic chamber is costly and time-consuming.

In order to overcome the drawbacks of the offline-calibration, an online-calibration is described in the following which is based on radar reflections from a "scene" in the environment of the vehicle 10 and the radar sensor 13 (see FIG. 1). The method for calibrating the radar sensor 13 uses "targets of opportunity", i.e. suitable target objects 21, 23 which occur arbitrarily in the environment of the vehicle 10.

For the calibration method, radar detections are selected which originate at "far-field" target objects 21, 23. From the radar detections, a range can be derived for each of the target objects 21, 23, and for the further method steps such target objects 21, 23 are selected for which the respective range is greater than a predetermined range. In other words, the available radar deflections can be easily filtered with respect to the range, and radar detections are disregarded for which the corresponding objects 21, 23 are located too close to the vehicle 10 and to the radar sensor 13 since their range with respect to the radar sensor 13 is smaller than the predetermined range.

The goal of the proposed method is to determine a so-called reconstructed array manifold for the radar sensor 13. The reconstructed array manifold of the radar sensor 13 is angle dependent and turned out to be sufficient for radar applications e.g. like angle finding. In addition, a full calibration matrix of the radar sensor can be calculated based on the reconstructed array manifold.

As an optional first step, a single-scatterer test is performed for the radar detections. That is, for each of the plurality of radar detections from the "scene" around the radar sensor 13, it is determined whether the respective radar detection is related to a single scattering center. The single-scatterer test is known in the art and described e.g. in EP 3 454 081 A1 or EP 3 144 696 A1. If it is determined that radar detections are not related to a single scattering center, the respective radar detections are disregarded for the next method steps.

Based on the plurality of radar detections which are acquired by the radar sensor 13, an angle of arrival is determined for each of the radar detections. For determining the angle of arrival of stationary targets, a Doppler based or range rate-based angle estimation method is typically used.

If the radar detections and their corresponding angles of arrival were directly used for determining the reconstructed array manifold, i.e. without the further steps as described below, non-equal weights were implicitly assigned to the plurality of radar detections, i.e. over the instrumental field of view 19 as shown in FIG. 1. This would lead to uncontrolled optimization results when determining the reconstructed array manifold and solving equation systems for determining the calibration matrix, e.g. via a least-squares estimation. In addition, certain angle sectors could even remain empty since no target object might be available for these angle sectors. This could lead to unpredictable calibration results for the empty angle sectors. This is illustrated in FIG. 3 in the upper left diagram which schematically depicts captured beam vectors (which are determined e.g. by a Fourier transform of raw radar detections) over the azimuth angle (Az). One can recognize the irregular distribution of the beam vectors due to the "targets of opportunity" which includes some "empty" angle sectors between the beam vectors.

Therefore, a "binning" procedure is necessary based on the original beam vectors in order to achieve a uniform distribution with respect to the azimuth angle (Az) as shown in the upper right diagram of FIG. 3.

Instead of performing the binning procedure with respect to the angle of arrival $\theta$, the method according to the disclosure uses a binning over a spatial frequency or electric angle u which is given by $u=\sin(\theta)$. This is illustrated in the lower diagram of FIG. 3. The angular range in which bins 31 are defined according to $u=\sin(\theta)$ is restricted by the instrumental field of view 19 (see FIG. 1) of the radar sensor 13 and may cover a part of the depicted range from −90 degrees to +90 degrees corresponding to a range from u=−1 to u=+1, as indicated in the diagram.

For such a range of $u=\sin(\theta)$, equidistant center spatial frequencies or electric angles $u_i=\sin(\theta i)$ are defined for the respective bin 31. The center spatial frequencies $u_i$ are shown in the lower diagram of FIG. 3 including "ideal" beam vectors as which depend on the respective center spatial frequency $u_i$. For the example as shown in FIG. 3, the indices of the defined bins 31 run from −2 to +2, wherein the center bin with index 0 corresponds to the boresight direction of the radar sensor 13. That is, each bin 31 of the electric angle is centered at a respective $u_i$ and has a spatial bandwidth $\Delta u_i$.

In FIG. 4, the bins 31 of the electric angle and the "ideal" beam vectors as are shown in the same manner as in the lower diagram of FIG. 3. In addition, the magnitude of single beam vector elements 41 is shown which are based on the measured detections provided by the radar sensor 13. That is, the beam vector elements 41 are assigned to the bins 31 of the electric angle based on their respective angle of arrival θ via u=sin (θ).

As can be recognized in FIG. 4, the bins 31 of the electric angle include an empty bin 43 to which no detections (i.e. corresponding beam vector elements 41) are assigned. Therefore, an interpolation is performed based on the beam vector elements 41 of the adjacent bins, i.e. for the example as shown in FIG. 4 for bin 1 based on the adjacent bins 0 and 2.

To most of the bins 31 as shown in FIG. 4, more than one measured detection and correspondingly more than one of the beam vector elements 41 is assigned. Therefore, an average value is calculated for each bin 31 based on the beam vector elements 41 which are assigned to the respective bin 31.

For the example as shown in FIG. 4, the magnitude of the single beam vector elements 41 is normalized, e.g. arbitrarily with respect to the first element, and the respective frequency offset for each of the beam vector elements 41 is corrected by a frequency shift to the respective center spatial frequency $u_i$. In order to do so, a weighted averaging is performed for the magnitude of the beam vector elements 41 which are assigned to the respective bin separately. The weighting for the average depends on the frequency shift which is necessary for the respective beam vector element 41 with respect to the center spatial frequency $u_i$. This results in a shifted (corresponding to a "nearest interpolation approach") and averaged magnitude 47 for each of the frequency bins 31 as defined in FIG. 3 and used in FIG. 4. Alternatively, any kind of local regression/smoothing approach can be applied resulting in a higher complexity, like e.g. a robust locally estimated scatterplot smoothing, known as (R)LOESS/(R)LOWESS. In addition, a complex-valued nonparametric or model-based fit 49 based on a model-based function can be performed for the final estimation of real/imaginary parts or of magnitude/phase of the beam vector elements 41.

FIG. 5 shows a picture of a real data scenario on the left side. For this scenario, a vehicle has been moving on a highway with a speed of about 30 m/s. For this scenario, online measurements have been performed via a MRR3 radar sensor. The result of these online measurements is shown on the right side of FIG. 5 where the frequency or number of detections, i.e. filtered single-scatterer detections 51, is plotted over the azimuth angle in degrees. The azimuth angle runs from −45 degrees to +45 degrees covering the instrumental field of view 19 of the specific radar sensor.

For the real data scenario as shown in FIG. 5, the resulting reconstructed array manifold is determined and compared with a reference which is based on a chamber calibration as shown in FIG. 2. The comparison is shown in FIG. 6 for the second beam vector element. In the upper diagram of FIG. 6, the real and imaginary parts of the reconstructed array manifold is plotted over the electric angle u, whereas in the lower diagram of FIG. 6, magnitude and phase of the reconstructed array manifold are plotted over the electric angle u. Here, the reconstructed array manifold has first been corrected by a conjugate of the ideal array response (or ideal beam vector) $a_i=a(u_i)$ calculated for each bin center frequency $u_i$ individually (which is also called "down-conversion" in this context). This step helps to omit the fast-changing phase of the phased array. After interpolation/smoothing, this operation needs to be inverted back by a correction with the ideal array response $a_i=a(u_i)$ calculated for each bin center frequency $u_i$ individually (which is also called "up-conversion" in this context). Please note that according to u=sin (θ), the electric angle u runs from about −0.7 to about +0.7 corresponding to an angle range from −45 degrees to +45 degrees.

In the upper diagram of FIG. 6, the real part of the reconstructed array manifold as determined by the method according to the disclosure is represented by the solid blue line 61, whereas the corresponding imaginary part is represented by the solid red line 62. The real part of the reconstructed array manifold according to the reference is represented by the dashed black line 63, whereas the corresponding imaginary part according to the reference is represented by the dashed red line 64. In addition, interpolated values are depicted for the reference by the small circles, i.e. for the real part by the black circles 65 and for the imaginary part by the red circles 66.

In the lower diagram of FIG. 6, the magnitude of the reconstructed array manifold determined by the method according to the disclosure is represented by the solid blue line 71, whereas the corresponding phase is represented by the solid red line 72. Furthermore, the magnitude of the reconstructed array manifold according to the reference is represented by the dashed black line 73, whereas the corresponding phase according to the reference is represented by the dashed red line 74. In addition, interpolated values are also depicted for the reference, i.e. for the magnitude represented by the black circles 75 and for the phase represented by the red circles 76.

As can be recognized in both diagrams of FIG. 6, a good agreement is achieved in general for the results provided by the method according to the disclosure and for the results provided by the reference. It is noted that the deviations for the magnitude and the phase in the ranges of greater angles, i.e. for an absolute value of u greater than about 0.3, reveal weaknesses of the offline chamber calibration due to the local surroundings of the radar sensor in the vehicle (which cannot be accounted for in the offline chamber calibration) rather than being related to errors of the online calibration. Due to the reliability of the method as described above, it can also be used as an additional source of information for fault detection and diagnosis of the radar sensor 13.

FIG. 7 shows a flow diagram 700 illustrating a method for calibrating a radar sensor according to various embodiments. At 702, a plurality of radar detections may be acquired via the radar sensor. At 704, an angle of arrival may be determined for each of the radar detections. At 706, equidistant bins of an electric angle may be defined which may be related to the angle of arrival. At 708, the radar detections may be assigned to the equidistant bins of the electric angle. At 710, a reconstructed array manifold may be determined based on the assignment for calibrating the radar sensor.

According to various embodiments, it may be determined for each of the plurality of radar detections whether the respective radar detection is related to a single scattering center.

According to various embodiments, radar detections may be disregarded for which it is determined that they are not related to a single scattering center.

According to various embodiments, a range may be determined for each of the plurality of radar detections with respect to the radar sensor, and a detection may be selected from the plurality of detections for the assignment to one of the bins of the electric angle only if the range of the detection is greater than a predetermined range.

According to various embodiments, the respective angle of arrival may be determined based on a range rate which may be estimated from the radar detections.

According to various embodiments, beam vector elements which are related to the radar detections may be determined, and the respective beam vector elements may be assigned to the bins of the electric angle.

According to various embodiments, for each bin of the electric angle to which no beam vector element is assigned, a complex value of the beam vector may be determined by interpolating between the beam vector elements assigned to the adjacent bins.

According to various embodiments, if more than one beam vector element is assigned to a bin of the electric angle, an average of the beam vector elements may be calculated which are assigned to the same bin.

According to various embodiments, a calibration matrix of the radar sensor may be calculated based on the reconstructed array manifold.

According to various embodiments, angle finding may be performed based on the reconstructed array manifold.

According to various embodiments, the angle finding may be performed by applying a maximum likelihood procedure.

Each of the steps 702, 704, 706, 708, 710 and the further steps described above may be performed by computer hardware components.

FIG. 8 shows a calibration system 800 according to various embodiments. The system 800 may implemented in the processing unit 15 (see FIG. 1) and may be provided for calibrating a radar sensor. The system 800 may include a radar detection circuit 802, an angle determination circuit 804, a bin definition circuit 806, an assignment circuit 808, and a array manifold determination circuit 810.

The radar detection circuit 802 may be configured to acquire a plurality of radar detections via the radar sensor. The angle determination circuit 804 may be configured to determine an angle of arrival for each of the radar detections. The bin definition circuit 806 may be configured to define equidistant bins of an electric angle which may be related to the angle of arrival. The assignment circuit 808 may be configured to assign the radar detections to the equidistant bins of the electric angle. The array manifold determination circuit 810 may be configured to determine a reconstructed array manifold based on the assignment for calibrating the radar sensor.

The radar detection circuit 802, the angle determination circuit 804, the bin definition circuit 806, the assignment circuit 808, and the array manifold determination circuit 810 may be coupled with each other, e.g. via an electrical connection 812, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

FIG. 9 depicts a computer system 900 with a plurality of computer hardware components configured to carry out steps of a computer implemented method for calibrating a radar sensor according to various embodiments. The computer system 900 correspond to the computer system 11 as shown in FIG. 1 and may include a processor 902, a memory 904, and a non-transitory data storage 906. The radar sensor 13 (see FIG. 1) may be provided as part of the computer system 900 (like illustrated in FIG. 9), or may be provided external to the computer system 900. The processor 902, the memory 904 and the non-transitory data storage 906 may be components of the processing unit 15 (see FIG. 1).

The processor 902 may carry out instructions provided in the memory 904. The non-transitory data storage 906 may store a computer program, including the instructions that may be transferred to the memory 804 and then executed by the processor 902. The radar sensor 13 may be used for acquiring radar sensor data, based on which a range rate may be acquired.

The processor 902, the memory 904, and the non-transitory data storage 906 may be coupled with each other, e.g. via an electrical connection 910, such as e.g. a cable or a computer bus or via any other suitable electrical connection to exchange electrical signals. The radar sensor 13 may be coupled to the computer system 900, for example via an external interface, or may be provided as parts of the computer system (in other words: internal to the computer system, for example coupled via the electrical connection 910).

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the system 800 and/or for the computer system 900.

REFERENCE NUMERAL LIST

10 vehicle
11 computer system
13 radar sensor
15 processing unit
17 boresight direction
19 instrumental field of view
21 moving target object
23 stationary target object
25 calibration object
27 arrow
29 arrow
31 bin of the electric angle
41 beam vector element
43 empty bin
45 interpolated magnitude of the beam vector element
47 shifted and averaged magnitude of the beam vector element
49 function fit
51 filtered single-scatterer detections
61 real part of the array manifold according to the method of the disclosure
62 imaginary part of the array manifold according to the method of the disclosure
63 real part of the array manifold according to the reference
64 imaginary part of the array manifold according to the reference
65 interpolated real part for the reference
66 interpolated imaginary part for the reference
71 magnitude of the array manifold according to the method of the disclosure
72 phase of the array manifold according to the method of the disclosure 73 magnitude of the array manifold according to the reference
74 phase of the array manifold according to the reference
75 interpolated magnitude for the reference
76 interpolated phase for the reference
700 flow diagram illustrating a method for calibrating a radar sensor
702 step of acquiring a plurality of radar detections via the radar sensor
704 step of determining an angle of arrival for each of the radar detections
706 step of defining equidistant bins of an electric angle related to the angle of arrival
708 step of assigning the radar detections to the equidistant bins of the electric angle
710 step of determining a reconstructed array manifold based on the assignment for calibrating the radar sensor
800 calibration system
802 radar detection circuit
804 angle determination circuit
806 bin definition circuit
808 assignment circuit
810 array manifold determination circuit
812 connection
900 computer system according to various embodiments
902 processor
904 memory
906 non-transitory data storage
910 connection

The invention claimed is:

1. A computer-implemented method for calibrating a radar sensor, the method comprising the following steps carried out by computer hardware components:
acquiring, via the radar sensor, a plurality of radar detections,
determining an angle of arrival for each of the radar detections,
defining equidistant bins of an electric angle being related to the angle of arrival, wherein the equidistant bin divides a predefined range for the electric angle into sectors which are centered at respective equidistant center electric angles and which have a constant spatial bandwidth,
assigning the radar detections to the equidistant bins of the electric angle, and based on the assignment, determining a reconstructed array manifold for calibrating the radar sensor.

2. The computer-implemented method according to claim 1, wherein for each of the plurality of radar detections, it is determined whether the respective radar detection is related to a single scattering center.

3. The computer-implemented method according to claim 2, wherein radar detections are disregarded for which it is determined that they are not related to a single scattering center.

4. The computer-implemented method according to claim 1, wherein for each of the plurality of radar detections, a range determined with respect to the radar sensor, and
a detection is selected from the plurality of detections for the assignment to one of the bins of the electric angle only if the range of the detection is greater than a predetermined range.

5. The computer-implemented method according to claim 1, wherein the respective angle of arrival is determined based on a range rate which is estimated from the radar detections.

6. The computer-implemented method according to claim 1, wherein
beam vector elements are determined which are related to the radar detections, and
the respective beam vector elements are assigned to the bins of the electric angle.

7. The computer-implemented method according to claim 6, wherein for each bin of the electric angle to which no beam vector element is assigned, a complex value of the beam vector is determined by interpolating between the beam vector elements assigned to adjacent bins.

8. The computer-implemented method according to claim 6, wherein if more than one beam vector element is assigned to a bin of the electric angle, an average of the beam vector elements is calculated which are assigned to the same bin.

9. The computer-implemented method according to claim 1, wherein a calibration matrix of the radar sensor is calculated based on the reconstructed array manifold.

10. The computer-implemented method according to claim 1, wherein angle finding is performed based on the reconstructed array manifold.

11. The computer-implemented method according to claim 10, wherein the angle finding is performed by applying a maximum likelihood procedure.

12. A computer system comprising a plurality of computer hardware components being configured to carry out steps of the computer implemented method of claim 1.

13. The computer system according to claim 12, further comprising a radar sensor configured to acquire the plurality of radar detections.

14. A vehicle comprising the computer system of claim 12.

15. A non-transitory computer readable medium storing instructions that, when executed by a processor, cause the processor to perform a computer-implemented method for
acquiring, via a radar sensor, a plurality of radar detections,
determining an angle of arrival for each of the radar detections, wherein the angle of arrival is defined with respect to a boresight direction of the radar sensor,
defining equidistant bins of an electric angle being related to the angle of arrival, wherein the equidistant bin divides a predefined range for the electric angle into sectors which are centered at respective equidistant center electric angles and which have a constant spatial bandwidth,
assigning the radar detections to the equidistant bins of the electric angle, and
based on the assignment, determining a reconstructed array manifold for calibrating the radar sensor.

16. The computer-implemented method according to claim 1, wherein the angle of arrival is defined with respect to a boresight direction of the radar sensor.

17. The non-transitory computer readable medium according to claim 15, wherein for each of the plurality of radar detections, it is determined whether the respective radar detection is related to a single scattering center.

18. The non-transitory computer readable medium according to claim 17, wherein radar detections are disregarded for which it is determined that they are not related to a single scattering center.

19. The non-transitory computer readable medium according to claim 15, wherein for each of the plurality of radar detections, a range determined with respect to the radar sensor, and a detection is selected from the plurality of detections for the assignment to one of the bins of the electric angle only if the range of the detection is greater than a predetermined range.

20. The non-transitory computer readable medium according to claim 15, wherein the respective angle of arrival is determined based on a range rate which is estimated from the radar detections.

* * * * *